US008697251B2

(12) United States Patent
Horton et al.

(10) Patent No.: US 8,697,251 B2
(45) Date of Patent: Apr. 15, 2014

(54) PROTECTIVE COATING FOR METAL SURFACES (75) Inventors: A Michael Horton, Trussville, AL (US); William H Owen, Fultondale, AL (US)

(73) Assignee: United States Pipe and Foundry Company, LLC, Birmingham, AL (US)

( * ) Notice: Subject to any disclaimer, the term of this patent is extended or adjusted under 35 U.S.C. 154(b) by 26 days.

(21) Appl. No.: 12/690,568

(22) Filed: Jan. 20, 2010

(65) Prior Publication Data
US 2011/0177358 A1 Jul. 21, 2011

(51) Int. Cl.
*B32B 15/01* (2006.01)
*B32B 15/04* (2006.01)
*B05D 1/02* (2006.01)
*B05D 1/36* (2006.01)
*B05D 1/00* (2006.01)

(52) U.S. Cl.
USPC .............................. 428/640; 428/469; 428/639

(58) Field of Classification Search
None
See application file for complete search history.

(56) References Cited

U.S. PATENT DOCUMENTS

| | | | |
|---|---|---|---|
| 1,381,085 A | 6/1921 | Dantsizen | |
| 2,428,526 A | 10/1947 | Osterheld | |
| 2,490,978 A | 12/1949 | Osterheld | |
| 2,566,138 A | 8/1951 | Osterheld | |
| 3,269,354 A | 8/1966 | Bloom | |
| 3,547,788 A * | 12/1970 | Masuda et al. | 205/188 |
| 3,952,120 A | 4/1976 | Horton et al. | |
| 4,298,661 A | 11/1981 | Ikeno | |
| 4,800,132 A * | 1/1989 | Grunwald et al. | 428/560 |
| 4,853,285 A * | 8/1989 | Sobata et al. | 428/336 |
| 4,950,504 A * | 8/1990 | Grunwald et al. | 427/242 |
| 5,089,349 A | 2/1992 | Kaiser | |
| 5,302,414 A | 4/1994 | Alkhimov et al. | |
| 5,409,970 A | 4/1995 | Mosser et al. | |
| 5,520,223 A | 5/1996 | Iorio | |
| 5,590,691 A | 1/1997 | Iorio | |
| 5,638,871 A | 6/1997 | Iorio | |
| 5,771,940 A | 6/1998 | Iorio | |
| 6,214,203 B1 | 4/2001 | Horton | |
| 6,276,400 B1 | 8/2001 | Jackson | |

(Continued)

FOREIGN PATENT DOCUMENTS

| | | |
|---|---|---|
| CN | 1147563 | 4/1997 |
| JP | 63-179735 | 7/1988 |
| WO | 99/50478 | 10/1999 |
| WO | 2009073716 | 6/2009 |

OTHER PUBLICATIONS

NASA Report NAS 8-20157, 1966, 16 pp.*
USPTO translation of DOWAN JP 63-179935, Jul. 1988.

(Continued)

*Primary Examiner* — Vera Katz
(74) *Attorney, Agent, or Firm* — Nathan W. Johnson; Nicholas J. Landau; Bradley Arant Boult Cummings LLP (57) ABSTRACT

A coating for a metal surface that provides excellent resistance to both electrochemical corrosion and mechanical insult is provided. The coating involves at least an inner coating that is a sacrificial anodic layer and an outer coating that is a protective dielectric material made of inorganic metal oxide. Some versions of the coating include an intermediate layer as well that serves to improve adhesion between the coatings and may provide additional galvanic protection. Although the coating can be made by a variety of methods, advanced methods of spray application are provided for making high-quality lightweight versions the coating.

16 Claims, 2 Drawing Sheets

(56) References Cited

U.S. PATENT DOCUMENTS

| | | | |
|---|---|---|---|
| 6,291,084 | B1 | 9/2001 | Darolia et al. |
| 6,358,397 | B1 | 3/2002 | Lyublinski |
| 6,554,992 | B1 | 4/2003 | Smith |
| 6,976,510 | B2 | 12/2005 | Campagna |
| 7,452,454 | B2 * | 11/2008 | Dolan .......................... 205/108 |
| 2002/0053954 | A1 * | 5/2002 | Shamsaifar et al. .......... 333/135 |
| 2002/0134690 | A1 | 9/2002 | Lyublinski |
| 2003/0064241 | A1 | 4/2003 | Suzuki et al. |
| 2004/0202885 | A1 | 10/2004 | Seth et al. |
| 2005/0115839 | A1 * | 6/2005 | Dolan .......................... 205/104 |
| 2006/0089281 | A1 * | 4/2006 | Gibson ........................ 510/201 |
| 2006/0105191 | A1 | 5/2006 | Holdik et al. |
| 2007/0048533 | A1 | 3/2007 | Spriestersbach et al. |
| 2007/0116886 | A1 * | 5/2007 | Refke et al. ................... 427/446 |
| 2007/0289879 | A1 | 12/2007 | Horton |
| 2009/0098373 | A1 * | 4/2009 | Dolan .......................... 428/336 |
| 2009/0252986 | A1 | 10/2009 | Owen et al. |
| 2009/0283611 | A1 * | 11/2009 | Varanasi et al. .............. 239/366 |

OTHER PUBLICATIONS

USPTO translation of Chen CN 1147563, Apr. 1977.
Sulzer Metco product data sheet on 9MBH Plasma Spray Gun, 2004, 4 pgs.
Herman, et al., "Thermal Spray Coating," Dept. of Materials Science and Engineering, SUNY Stony Brook, NY, Oct. 31, 2007, from internet web.archive.org/web/20071031085938/http://www.matscieng.sunysb.edu/tsl/thermal/article1.htm.
ISR PCT/US08/13348, Mar. 2009.
Nema, "White Paper on Hexavalent Chrome on Steel Conduit," 2004, four pages, downloaded from https://www.nema.org/gov/ehs/positions/upload/White%20paper%20Chromium%20NEMA%201%2004.pdf.
Owen, William H., et al., Final Office Action for U.S. Appl. No. 12/315,529, filed Dec. 4, 2008, mailed Nov. 2, 2011, 13 pgs.
Owen, William H., et al., Non-Final Office Action for U.S. Appl. No. 12/315,529, filed Dec. 4, 2008, mailed May 10, 2011, 9 pgs.
Owen, William H., et al., Non-Final Office Action for U.S. Appl. No. 12/315,529, filed Dec. 4, 2008, mailed Nov. 24, 2010, 12 pgs.
Owen, William H., et al., Non-Final Office Action for U.S. Appl. No. 12/315,529, filed Dec. 4, 2008, mailed Jun. 10, 2010, 12 pgs.
Owen, William H., et al., U.S. Patent Application Entitled: Anti-Corrosive Coating for Metal Surfaces, having U.S. Appl. No. 12/315,529, filed Dec. 4, 2008, 29 pgs.
Owen, William H.; Examiner Interview Summary for U.S. Appl. No. 12/315,529, filed Dec. 4, 2008, mailed Feb. 9, 2011; 4 pgs.
Owen, William H.; Examiner Interview Summary for U.S. Appl. No. 12/315,529, filed Dec. 4, 2008, mailed Jul. 28, 2011; 4 pgs.
Owen, William H.; PCT Application Entitled: Anti-Corrosive Coating for Metal Surfaces, having serial No. PCT/US08/13348, filed Dec. 4, 2008.
Horton; Canadian Patent Application Entitled: Protective Coating for Metal Surfaces having application No. 2,728,345, filed Jan. 17, 2011.
Horton; Gulf Coorporation Council Patent Application Entitled: Protective Coating for Metal Surfaces having application No. 2011/17621, filed Jan. 19, 2011.
Weber; U.S. Provisional Application Entitled: Exterior Coating for Iron Pipe, having U.S. Appl. No. 60/992,143, filed Dec. 4, 2007.
Vanysek, P."Electrochemical Series", online version of CRC Handbook of Chemistry and Physics, 81st (2000-2001) ed. downloaded from www.nmsl.chem.ccu.edu.tw/pdf/CRC%20Handbook/08_08_00_Electrochemical%20Series.pdf.
Jeng-Kuei Chang, et al. "Microstructure and Electrochemical Characteristics of Aluminum Anodized Film Formed in Ammonium Adipate Solution"; Journal of the Electrochemical Society, 2003, vol. 150, Issue 6, pp. B266-B273.
American Welding Society "Thermal Spraying Practice, Theory, and Application"; copyright 1985; Library of Congress No. 84-62707; International Standard Book No. 0-87171-246-6; pp. 194; American Welding Society, Miami, Florida.

* cited by examiner

PROTECTIVE COATING FOR METAL SURFACES

BACKGROUND

A. Field of the Disclosure

The present disclosure relates generally to advanced protective coatings for metal surfaces. Such coatings as well as methods of making and using them are provided in this disclosure.

B. Background

Corrosion is an electrochemical process that occurs when an electrically conductive metal structure is in contact with an electrically conductive substance, such as water. In such situations a current leaves a structure at an anode site, passes through an electrolyte, and reenters the structure at a cathode site. The electric current causes chemical changes in the structure, converting the metal to a structurally unsound corrosion product. As an example, one small section of a pipeline may be anodic because it is embedded in soil that is more conductive than the soil along the rest of the pipeline. Current flows between the anode and cathode facilitated by the conductive pipe and the electrolytic soil. In the process, the metal in the pipe undergoes a shift in oxidation state that results in electrochemical corrosion.

Cathodic protection is a method to reduce corrosion by minimizing the difference in potential between anode and cathode. This is achieved by applying a current to the structure to be protected from some outside source. When enough current is applied, the whole structure will be at one potential; thus, anode and cathode sites will not exist. Cathodic protection is commonly used on many types of structures in corrosive electrolytic environments, such as pipelines, underground storage tanks, locks, and ship hulls.

There are two main types of cathodic protection systems: galvanic and impressed current. A galvanic cathodic protection system makes use of the corrosive potentials for different metals. Without cathodic protection, when one area of the structure has a higher negative potential than another, corrosion results. If, however, a much less inert object (that is, an object with much more negative potential) is placed adjacent to the structure to be protected, such as a pipeline, and an electrical connection exists between the object and the structure, the object will become the anode and the entire structure will become the cathode. The new object corrodes instead of the structure thereby protecting the structure. In this example, the object is called a "sacrificial anode." Thus, the galvanic cathodic protection system is also called a "sacrificial cathodic protection system" because the anode corrodes "sacrificially" to protect the structure. Galvanic anodes are made of metals with higher negative potential than the metal of the structure itself; the metal of the anode is said to be "anodic" compared to the metal of the structure.

Attachment of the anode is normally done at the jobsite utilizing underground insulated wire, thermite weld, conventional weld, or threaded bolts. Problems related to these methods of attachment to the structure include, but are not limited to: improper placement of the anode, improper size of the anode, improper composition of the anode, damage to the metallic object or the internal lining from excessive heat from the weld, loss of structural integrity of the metallic object, damage to the anode, wire, or electrical connection during installation and backfilling operations, improper weld or connection at the jobsite resulting in the loss or reduction in effectiveness of protection, and failure to remove protective wrapping from the anode prior to burial. Traditional sacrificial anode placement of buried structures also requires extra trench excavation either several feet below the structure or several feet to the side of the structure. As a result, there is a long-felt need in the art for an effective means of galvanic protection without these limitations.

One method of protection which solves the problems listed above is a metallic sacrificial coating applied directly to the structure's surface. The coating acts as a barrier between the metal in the structure and the environment, and if breached it acts as a sacrificial anode to prevent corrosion. However, traditional methods of providing a sacrificial coating have several drawbacks. Traditional methods, such as hot-dip galvanizing, electroplating, thermal diffusion galvanizing, and vapor galvanizing are expensive, energy-intensive, and time-intensive; in addition, most traditional methods provide poor control of the thickness and consistency of the anodic coating. Accordingly, there is a long-felt need in the art for methods of applying corrosion protection that allow rapid, inexpensive, thin yet complete coatings to be applied.

As materials become increasingly expensive, there is a need to provide thin yet effective galvanizing layers. Although thin layers of anodic metal have the advantage of lower weight and cost, they have the disadvantages of being easily damaged or worn off. An anodic layer can be protected by a barrier layer, but over time barrier layers have a tendency to delaminate and allow corrosive material to contact the anodic layer. Accordingly, there is a long-felt but unmet need in the art for a galvanically protective coating paired with a barrier coating that will be durable, long-lasting, and with superior adhesion characteristics.

SUMMARY

The disclosure provides novel and useful protective coatings for metal surfaces, methods of making them, methods of using them, and apparatuses comprising them. The following goals are met by at least some embodiments of the processes, machines, manufactures, compositions of matter, and other teachings of the instant disclosure: to provide galvanic protection to a metal surface that does not require post-manufacturing assembly or construction; to provide galvanic protection to a metal surface rapidly and economically; and to provide a galvanic coating and a dielectric coating that will have superior adhesive qualities.

These and other goals are met by providing a coated metal surface comprising: a metallic substrate; an outer coating comprising an oxide of a second metal, wherein the oxide of the second metal is dielectric; and an inner coating disposed between the substrate and the outer coating, the inner coating comprising a first metal that is anodic to the substrate, wherein the first metal is substantially electrically connected to the metallic substrate. These and other goals are also met by providing a process (and the product thereof) of coating a metal surface, comprising: applying an inner coating to a metal substrate, the inner coating comprising a first metal that is anodic to the substrate; and applying an outer coating to the side of the inner coating opposite to the substrate, the outer coating comprising an oxide of a second metal, wherein the oxide of the second metal is dielectric; and wherein the first metal is substantially electrically connected to the metal substrate.

DETAILED DESCRIPTION

A. Definitions

The terms "include" and "including" as used herein are non-limiting, and can be read to mean "including but not limited to."

The term "anodic" as used herein refers to the property of having a more negative electrical potential than some reference substance. Unless otherwise stated, in this disclosure the reference substance is a metallic substrate that is the subject of galvanic protection.

All terms in the singular should be read to include the plural, and vice-versa, unless otherwise stated. Similarly, any male pronouns should be read to include the female, and vice-versa, unless otherwise stated. Unless stated otherwise, terms should be read to have their accepted dictionary definitions.

B. Coated Metal Surfaces

As explained above, metal surfaces exposed to an electrolyte are subject to electrochemical corrosion, particularly if the surface develops differentially charged regions such that some parts of the surface function as cathodes and others as anodes. Corrosion can be deterred using a galvanic cathodic protection system. Galvanic coatings have numerous advantages over other forms of anode. However, galvanic coatings, if damaged, can expose the underlying metal substrate. Although the underlying metallic substrate will still be galvanically protected, it will be subject to more rapid corrosion than otherwise and is vulnerable to further mechanical damage. For this reason, it is desirable to provide a coating to protect the surface from mechanical insult, to prevent contact with corrosive substances in the environment, and to insulate the substrate from stray electrical currents. By separating the metallic substrate from corrosion-inducing aspects of the environment, non-galvanic "barrier" coatings can also be effective in preventing corrosion.

These and other goals can be achieved by providing a metallic substrate to be protected, an outer coating comprising a dielectric metal oxide, and an inner anodic coating between the substrate and the outer coating that is electrically connected to the substrate. The inner coating comprises a first metal that is anodic with respect to the substrate. The outer coating comprises a dielectric oxide of a second metal, wherein the second metal may be the first metal or a metal other than the first metal. The inner coating is substantially electrically connected to the metal substrate, such that it provides galvanic protection to the substrate. The dielectric metal oxide provides at least partial protection from electrical currents, the corrosive environment, and mechanical damage. In some cases it is desirable to provide a intermediate coating comprising a third anodic metal.

The coated surface, and any individual coating, may also be the product of any of the processes described below.

1. Metallic Substrate

The metallic substrate can be any metal that is subject to electrochemical corrosion, as known by those skilled in the art. Because underground and submerged structures are particularly subject to corrosion, metals that are commonly used in underground and submerged structures are advantageously protected by the coating. In pipes the metal is typically ferrous metal, steel, iron, iron alloys, lead, nickel, brass or copper. However, the utility of the coatings is not limited to these metals or to any particular applications. The metallic substrate will often be a portion or a surface of a greater system or structure, as is described more completely below.

2. Inner Coating

An inner coating is present between the outer coating and the substrate. The inner coating may cover the entire substrate, or only a portion of the substrate. The portion will often be the part of the substrate that is most likely to encounter corrosive conditions (such as the exterior surface of an underground pipe or the interior surface of a conduit for a strong electrolyte). The thickness of the inner coating will depend on several factors. Thinner inner coatings have the advantages of lower cost and lower weight. Thicker inner coatings have the advantage of greater durability and longevity. If the coating as a whole is too thick, assembly of coated parts becomes more complicated or impossible. For example, it has been found that coatings on fluid conveyance component parts should ideally not exceed about 10 mils (25.4 µm) in total thickness for ease of assembly and seal integrity. A good balance between the competing advantages of a thicker inner coating versus a thinner inner coating may be for example 2-3 mils (50.8-76.2 µm), or about this range. The inner coating will typically be porous or somewhat porous depending on the method of application, although the inner coating can still provide galvanic protection if it is non-porous.

The inner coating is composed of a first metal that is anodic in comparison to the substrate (a "first anodic metal"). This can be any metal that is anodic to the metal of the substrate. For ferrous substrates, the first anodic metal may comprise for example zinc, aluminum, magnesium, indium, gallium, tellurium, or alloys of one or more of the foregoing. Some types of first anodic metal have the advantage of forming oxides upon sacrificial oxidation that function to protect the underlying metal from further oxidation; most advantageously such metals will form oxides that are insoluble, tenacious (adhere firmly to the metal), and do not readily form hydrates. Such properties will be influenced by the conditions surrounding the coating, as is understood by those skilled in the art.—The inner coating will often comprise a very high content of the anodic metal, for example 50%, 90%, 95% 99%, 99.9%, or about these values. The alloys may comprise additional elements, for example carbon or silicon, to enhance the adhesion of the coating to the substrate or other properties, as is understood by those skilled in the art. Particularly useful anodic metals for ferrous substrates are substantially pure zinc, substantially pure magnesium, substantially pure aluminum, aluminum-zinc alloy, aluminum-silicon alloy, and indium alloy. Indium alloys are particularly useful in high salinity environments. An aluminum-zinc alloy can be used that comprises, for example, 85 parts zinc to 15 parts aluminum (or about this ratio). An aluminum-silicon alloy can be used that comprises, for example, 88 parts aluminum to 12 parts silicon (or about this ratio). In some embodiments of the coating, the inner coating mainly comprises metallic zinc, as zinc is inexpensive, adheres well to ferrous substrates, and provides excellent anodic protection to ferrous substrates. Some embodiments of the inner coating comprise at least about 50%, 90%, 95% 99%, 99.9%, or 100% metallic zinc (or at least exactly these values). Some embodiments of the inner coating essentially consist of metallic zinc. Some embodiments of the inner coating mainly comprise metallic aluminum, as aluminum is inexpensive, durable, forms a tenacious protective oxide layer upon oxidation, and provides good anodic protection to ferrous substrates. Some embodiments of the inner coating comprise at least about 50%, 90%, 95% 99%, 99.9%, or 100% metallic aluminum (or at least exactly these values).

The inner coating can be applied by any method known in the art, or by spraying techniques described below. The spraying techniques have the advantage of applying a thin consistent layer rapidly at low cost. Adhesion can in some cases be improved by application of an underlayer to the metallic substrate prior to application of the inner coating. The underlayer is preferably very thin, such as a flash coating. For example, the adhesion of an aluminum inner coating to a ferrous substrate can be greatly improved by the application of a zinc underlayer flash coating. Zinc provides excellent adhesion, creates little pollution, and is relatively inexpensive. An underlayer flash coating of cadmium also provides excellent adhesion characteristics. Other flash coatings that enhance the adhesion of certain anodic metals to certain substrate metals are known in the art, and can be used in the context of the coated metal surface.

It is critical that the inner coating is at least partially electrically connected to the substrate. In some embodiments of the coating, the inner coating is substantially electrically connected to the substrate or completely electrically connected to the substrate. In this context, "substantially electrically connected" means that a substantial portion of the first metal can convey a current to the substrate. The inner coating may be at least partially in contact with the substrate. Such contact is one means of providing the electrical connection between the inner coating and substrate. In some embodiments of the coating, the inner coating is in complete contact with the substrate (contacting the substrate at substantially every area where corrosion protection may be necessary).

3. Outer Coating

The outer coating functions as a barrier, preventing contact from the lower coatings and substrate to the potentially corrosive environment. This includes preventing contact with electrolytes and other aggressive fluids. The outer coating also functions as a dielectric coating, preventing contact with unwanted electrical currents. The outer coating may also function to prevent contact with solid objects that would otherwise wear away the other coatings and substrate, or conduct unwanted electric currents to the other coatings and substrate. The outer coating can also function to protect the other coatings and substrate from wear resulting from contact with flowing fluids, with or without suspended abrasive particles. It is advantageous if the outer layer is at least one of: dielectric, resistant to wear, resistant to impact, resistant to fracture, and flexible. The outer layer may be permeable to corrosion products, electrolytes, or both. It is also advantageous if the outer layer is inexpensive and amenable to advanced coating techniques, such as thermal spraying and cold spraying.

Metal oxides have many advantages over other types of dielectric materials, such as commonly used organic polymers. Metal oxides can be extremely hard, and in fact are among the hardest materials known. As such they are generally more resistant to abrasion and impact than are polymers. Metal oxides do not oxidize even under highly oxidizing conditions, whereas many commonly used polymers are subject to oxidation and degradation, for example during storage or weathering. Metal oxides have extremely high temperatures of fusion, and can be applied to a workpiece at a much higher workpiece temperature than can organic polymers; furthermore, metal oxides will not burn if applied at high temperature in an oxidizing atmosphere. This allows the outer coating to be applied to a metallic workpiece shortly after annealing, without delay to allow the workpiece to cool.

Many metal oxides are insoluble in both hydrophobic and hydrophilic solvents (particularly at low temperatures), unlike most organic polymers which may dissolve or degrade in contact with hydrophobic solvent. This allows metal oxides to be used for applications such as coatings for the interiors of storage tanks for organic solvents or conduits for organic solvents. Furthermore, the synthesis and application of metal oxides does not involve emissions of volatile organic compounds, nor do they contain residual VOC after application; as a result, they are less polluting and pose less hazard in the workplace than do organic polymers.

The outer coating comprises a mechanically resistant dielectric material. In some embodiments of the outer coating, the material comprises a dielectric oxide of a second metal. Such dielectric oxides are known to those skilled in the art. Such oxides include oxides of silicon, aluminum, magnesium, and titanium. The outer layer may be mostly comprised of the oxide, and exemplary concentrations of the oxide include at least 50%, 90%, 95%, 99%, 99.5%, 99.9%, 100%, and about these values. In some embodiments, the second metal is the same as the first metal. Aluminum oxide ($Al_2O_3$) is one example of a suitable dielectric oxide. It is durable, highly dielectric, abundant, inexpensive, and forms a tenacious passive oxide layer. It is also insoluble in water and has high resistance against weathering and strong acid. It has good thermal conductivity compared to most dielectric materials and can reduce thermal shock resistance. The composition of aluminum oxide can be easily changed to enhance certain desirable material characteristics such as the hardness or color. Aluminum oxide is an electrically insulating material with high resistivity that increases with purity. With its high corrosion resistance, it does not wear easily, even when challenged with strong acid. Aluminum oxide can also be applied to surfaces by thermal spraying in the form of a powder.

The thickness of the outer layer will vary depending on the structure to be coated, the environment, the dielectric material used, and other factors. A thin layer has the advantage of the efficient diffusion of corrosion products from the other coatings and substrate, greater flexibility, lower weight, lower volumes, and lower cost. A thin layer will also pose less interference during assembly and installation in using coated structures due to increased thickness. A thick layer has the advantage of more robust and lasting protection. An exemplary outer coating may be 2-6 mils (50.8-152.4 μm) in thickness, or about this range.

The outer coating is disposed on the opposite side of the inner coating from the substrate. Some embodiments of the outer coating are in direct contact with the inner coating. Some embodiments of the outer coating are in direct contact with the intermediate coating described below. In some embodiments of the coating, there are intervening layers or interstices between the outer coating and either of the inner coating or the intermediate coating.

Some embodiments of the outer coating are permeable to the corrosion products of the coating underlying the outer coating (the inner or intermediate coating). The corrosion of the underlying coating can in some cases cause blistering and spalling of the outer coating. This occurs when the surface of the underlying coating that is in contact with the outer coating corrodes to form a corrosion product that has poor mechanical properties, swells due to the formation of a hydrate, or that is soluble in the medium. The corrosion product may also occupy a greater molar volume than the non-corroded material of the underlying coating, causing blistering (this is generally true in the case of hydrates). As there is no longer a solid surface of the underlying coating to which the outer coating can adhere, the outer coating will spall from the underlying coating. This blistering and spalling can be prevented or reduced by providing an outer coating that is permeable to the corrosion product. Corrosion products will diffuse in some cases from the interface between the outer coating and the underlying coating into the medium, preventing blisters. Permeability may be due to the composition of the outer coating, the thickness of the outer coating, or the porosity of the outer coating. Metals that form soluble oxides have the advantage of being capable of aqueous diffusion if the outer coating is permeable. Permeability may be increased by providing a thin outer coating or a porous outer coating.

Alternatively, an impermeable outer coating can be used. An impermeable outer coating has the advantage of preventing contact of the lower coatings with the environment. Such impermeable outer coatings will typically be non-porous and sufficiently thick to prevent diffusion.

Some embodiments of the outer coating are permeable to the medium in contact with the outer coating. The medium will generally be air, soil, or water. However, the medium can be nearly any form of matter depending on the application. Other examples of media include compressed natural gas, hydrocarbon fuel, liquefied gasses, refrigerant, biological fluids, or any other fluid material. Under some conditions, by allowing the anodic metal in one or more of the underlying coatings to contact the medium anodic protection can be provided to the substrate. Again, permeability may be due to the composition of the outer coating, the thickness of the outer coating, or the porosity of the outer coating.

Some embodiments of the outer coating comprise an additive that provides improved properties. Such properties include, for example, suitability for spray application, resistance to abrasion, hardness, strength, toughness, elasticity, plasticity, brittleness, ductility and malleability. Examples of additives include a fluxing agent (which removes impurities), an agent to lower the temperature of fusion, and an agent that improves the flow characteristics of the coating material during spraying. Feldspar, for example, improves the application of magnesium oxide to surfaces. Silica generally improves the spray characteristics of solids by improving flow.

Some embodiments of the outer coating comprise a topcoat. The topcoat serves as a further barrier between the environment and the coated surface. The topcoat materials may be organic, inorganic, or a combination of organic and inorganic material. The topcoat will advantageously be dielectric, impermeable to water (or other medium to which the coated metal surface is likely to be exposed), or both. Suitable organic topcoats include asphalt, wax, and paint. The topcoat may serve any of a variety of other purposes, such as: sealing interstices between grains of oxide, reducing the external roughness of the coated metal surface, reducing friction during assembly (for example during joint assembly and horizontal directional drilling), and improving the appearance of the final product.

4. Intermediate Coating

Some embodiments of the coated metal surface comprise an intermediate coating. The intermediate coating is disposed between the inner and outer coating, and comprises a third metal that is anodic to the metallic substrate. The third metal is substantially electrically connected to at least one of the metallic substrate and the inner coating. This allows the third metal to function as a sacrificial anode to at least one of the metallic substrate and the inner coating.

The third metal may be any metal that is anodic to the substrate. This may include any metal that is disclosed herein as suitable as the first metal. The third metal may additionally be anodic to the first metal. If the third metal is anodic to the first metal, the intermediate coating has the advantage of providing anodic protection to the inner coating. In some embodiments of the intermediate coating, the third metal is: an alloy comprising at least one of the first metal and the second metal, an alloy of the first and second metals, the second metal, or the first metal. A third metal that is an alloy of the first and second metals has the advantage of providing superior adhesion to both the outer coating and the inner coating. Exemplary embodiments of the third metal comprise an aluminum alloy, a zinc alloy, at least 50% of one of zinc or aluminum, an alloy of zinc and aluminum, and essentially pure aluminum metal. Aluminum, for example, has the advantage of low cost, durability, good corrosion resistance, and is anodic to most other metals (the exceptions being zinc, beryllium, and magnesium). Both aluminum and zinc have the advantage of forming protective oxides upon corrosion, which can create a "backup" oxide layer in addition to the oxide in the outer coating.

The intermediate coating may be a composite coating. Such a composite coating would be present in at least partial contact with the inner coating. In some embodiments of the composite coating, the third metal and a fourth metal are interspersed in the coating so as to form a matrix of the two substances. Some embodiments of the composite coating comprise the third metal and a metal oxide. The metal oxide may be any metal oxide that is suitable of the metal oxide in the outer coating, including the oxide of the second metal.

Figure 1:
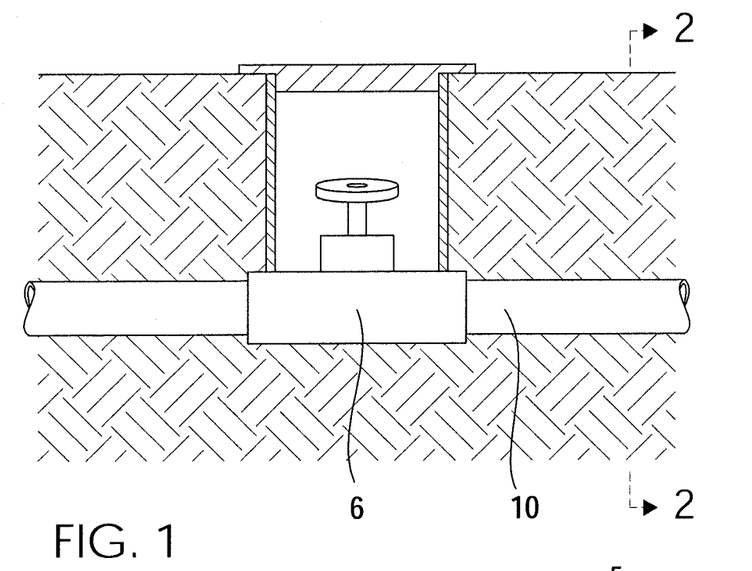
FIG. 1: This figure depicts a coated underground pipe and valve.
Figure 2:
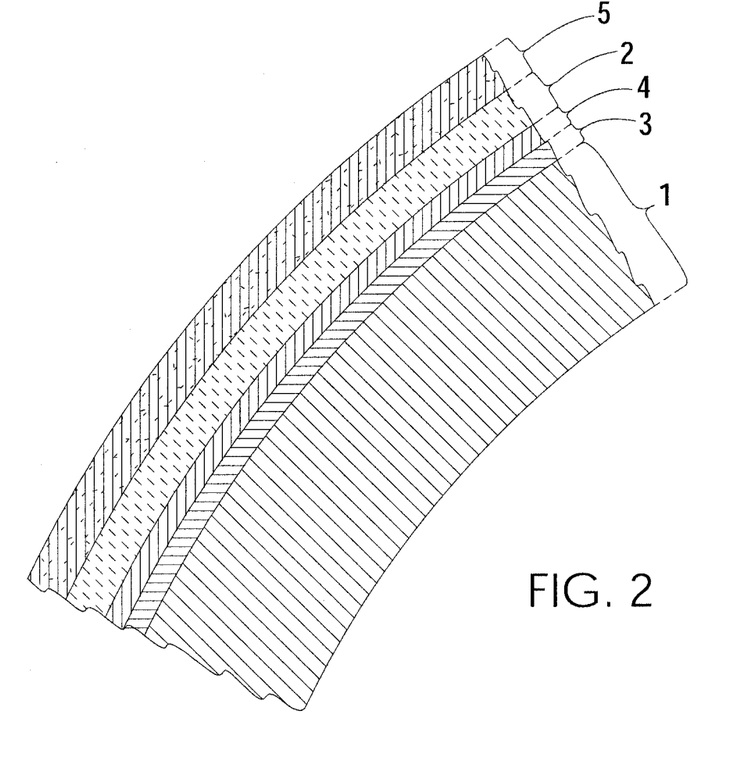
FIG. 2: This figure shows a cutaway view of the pipe of FIG. 1 to illustrate the components of the coating.
Figure 3:
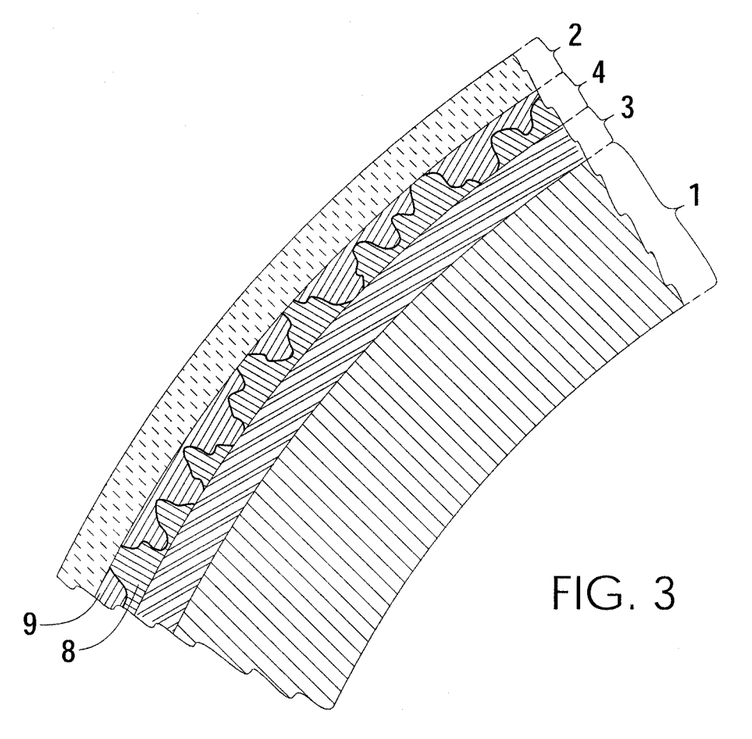
FIG. 3: The figure shows a cutaway view of an embodiment of the coated metallic surface in which the intermediate coating is a composite coating.

The matrix can be of regular configuration or it can be of randomized configuration. The matrix will allow the third metal to contact the inner coating in at least substantial portions of the intermediate coating. This contact allows the third metal to be electrically connected to the substrate through its electrical connection to the inner coating. In other words, when viewed from the side cross-section, it is desirable that the composite intermediate coating be such that either: (1) the third metal particles are large and the thickness of the intermediate composite coating is small such that the third metal particles protrude through and are exposed on both sides of the intermediate composite coating or (2) the concentration of the metal particles is sufficient to result in an electrically continuous conductive path from one side of the intermediate composite coating to the other. The ratio of components of the composite (such as the third metal to fourth metal, or the third metal to a metal oxide) should be formulated with this in mind.

The third metal can be any metal that is anodic with regard to at least one of the substrate and the inner coating. The third metal can be any of the metals described as suitable for the first metal. In some cases the first metal and the second anodic metal 6 will be the same. This has the advantages of simplicity in manufacturing, good galvanic protection, and superior adhesion between the intermediate composite coating and the inner coating.

The fourth metal provides superior adhesion to the coated surface, preventing non-adhesion events such as spalling and blistering. In many cases the superior adhesion will be achieved due to better bonding characteristics between the third metal and the oxide of the second metal in the outer coating. If the fourth metal is the same as the second metal, the fourth metal may also function to regenerate the oxide of the second metal in the outer coating. Should the outer coating be breached, the fourth metal will react with ambient oxidants to form a layer of metal oxide. The fourth metal may be any metal that is disclosed to be suitable as the second metal. Two examples, titanium and aluminum, have the advantage of forming oxides that are tenaciously associated with the underlying non-oxidized metal. As a result, as titanium and aluminum weather under oxidizing conditions, a fine oxide layer forms tightly bound to the underlying metal which protects the underlying metal from further weathering.

Similarly, the metal oxide in the composite provides superior adhesion with the metal oxide in the outer coating. The use of the same metal oxide in the composite as is present in the outer coating provides particularly good adhesion between the intermediate coating and the outer coating.

One simple embodiment of the intermediate layer comprises the first metal, and the outer coating comprises an oxide of the first metal. Another simple embodiment of the intermediate layer comprises a composite of the first metal and an oxide of the first metal, and the outer coating comprises the oxide of the first metal. An example of one such embodiment is a coated metal surface comprising an inner layer of aluminum, an intermediate layer comprising a composite of aluminum and $Al_2O_3$, and an outer layer comprising $Al_2O_3$.

As discussed elsewhere in this disclosure, those skilled in the art understand that a balance must be achieved between providing a thick coating with enhanced durability and providing a thin coating with lower weight and volume. The same balance must be achieved in the intermediate coating as in the other coatings. An intermediate coating of about or exactly 2-3 mils (50.8-76.2 µm) in thickness is suitable for the coated metal surfaces of the instant disclosure.

The intermediate coating may be at least partially in contact with the outer coating or the inner coating (or both). Such contact is one means of providing the electrical connection between the intermediate coating, the inner coating, and the substrate. In some embodiments of the coating, the intermediate coating is in complete contact with the inner coating (contacting the inner coating at substantially every area where corrosion protection may be necessary). Some embodiments of the intermediate coating are in complete contact with the outer coating.

Some embodiments of the intermediate coating are permeable to the corrosion products of the inner or intermediate coating. Such corrosion can in some cases cause blistering and spalling, as described above. Permeability may be due to the composition of the intermediate coating, the thickness of the intermediate coating, or the porosity of the intermediate coating. Metals that form soluble oxides have the advantage of being capable of aqueous diffusion if the intermediate coating is permeable. Permeability may be increased by providing a thin coating or a porous coating.

Alternatively, an impermeable intermediate coating can be used. An impermeable intermediate coating has the advantage of preventing contact of the inner coating with the environment. Such impermeable intermediate coatings will typically be non-porous and sufficiently thick to prevent diffusion.

B. Metallic Structures

The disclosure provides metallic structures comprising any of the coated metallic surfaces disclosed herein. This can be a structure that is in periodic, frequent, or constant contact with an electrolyte. Such structures may be underground, submerged, or in extremely humid environments. Metallic structures that are submerged include marine and aquatic structures, such as ships, chains, seawalls, flood control structures, dams, bridges, fixed and mobile offshore platforms, submarine and submersibles, pipelines, cables, navigation structures, locks, subsea systems, and coastal structures such as piers. Fluid conveyances are examples of structures than are frequently in contact with water, including groundwater, seawater, and open freshwater. Fluid conveyances include a pipe, a pipe fitting, a pipe valve, a pump component, a pipe fixture, and an appurtenance to a pipe. One example is piping that is subject to corrosion, such as underground piping. Underground piping systems are well known in the art, and include important infrastructure systems such as freshwater pipes, sewer pipes, storm drains, steam pipes, and fuel gas pipes. Such conveyances are virtually always located underground between source points (such as treatment or production plants) and delivery points. Aboveground pipes may also be suitable substrates, particularly in areas of high humidity or precipitation.

Other structures that benefit from protection against corrosion are well known in the art, any of which could benefit from the coated metal surfaces disclosed herein.

C. Process for Coating a Metal Surface

Novel processes of coating a metal surface have been developed. These processes are useful to produce any of the coated metal surfaces of this disclosure, as well as other coatings.

The process involves applying an inner coating to a metallic substrate, the inner coating comprising a first metal that is anodic to the substrate; and applying an outer coating on the side of the inner coating opposite the substrate, the outer coating comprising an oxide of a second metal, wherein the oxide of the second metal is dielectric; and wherein the first metal is substantially electrically connected to the metal substrate. Some embodiments of the process include applying an intermediate coating to the inner coating, the intermediate coating comprising a third metal that is anodic to the metallic substrate, wherein the third metal is substantially electrically connected to the first metal, and wherein the outer coating is applied to the intermediate coating. In some embodiments of the process, at least one of applying the inner coating, applying the intermediate coating, and applying the outer coating comprises spray application, for example thermal spraying.

To facilitate coating of the substrate, the substrate may be abraded or heated. If the substrate is heated, the temperature will typically be up to the fusion temperature of the coating. For certain purposes it is optimal to heat the substrate to the coating's fusion temperature or about this temperature. While it is advantageous to heat or abrade the substrate for this purpose, it is not necessary in every case.

The coatings may be applied by any methods known in the art. However, there are distinct and unique advantages to the use of advanced spray methods to apply at least one of the coatings. Advanced spray methods are inexpensive compared to other coating methods. They require little infrastructure, require little time, and can be performed on the site at which the metallic substrate is manufactured. Spray techniques can achieve thin yet uniform coatings which are of unique value in rigorously protecting surfaces without unnecessary weight or volume.

Thermal spraying is particularly useful in the disclosed coated metal surfaces and processes. Any thermal spraying method can be used, including detonation spraying, flame spraying (powder or wire), high-velocity liquid fuel spraying, high-velocity air fuel spraying, high-velocity oxygen fuel spraying, plasma spraying, and arc spraying. Cold spraying and warm spraying techniques can be used; in some cases the material to be sprayed will be heated prior to application by cold spraying. If the material is applied by thermal spraying, the sprayed material will be in a liquid state at the time it is sprayed. If the sprayed material is applied by cold spraying or warm spraying, the sprayed material may be solid or liquid at the time it is sprayed.

The coated metal surface, substrate, inner coating, intermediate coating, and outer coating may be any of the substrates or coatings described herein.

1. Application of Metal Coatings

The inner coating or intermediate coating ("metal coatings") may be applied to the substrate or inner coating ("target surface") by any method known in the art. Such methods include hot-dip galvanizing, electroplating, thermal diffusion galvanizing, and vapor galvanizing. The metal coatings may also be applied by advanced spraying techniques. Thermal spraying methods such as flame spraying (wire or powder), arc spraying, and plasma spraying are examples of advanced spraying methods that produce good results in applying the metal coatings. Thermal spraying has the advantage of providing good adhesion and inflicting little impact stress on the target surface, as the sprayed material is liquid. The metal coatings may be cold-sprayed, in which case the metal will be below its fusion temperature during spraying. Spraying metal at low temperature has the advantage of inflicting less thermal stress on the target surface, and allowing the newly coated target surface to be handled or moved soon after spraying. If the metal coating is thermally sprayed onto the target surface, it will be sprayed at or above the fusion temperature of the first, third, or fourth metal for the inner or intermediate coating, respectively.

The process may further comprise applying an underlayer to the substrate to improve adhesion of the inner coating to the substrate. The underlayer may be of any type or composition described above.

Regardless of whether thermal or cold spraying methods are used, the metal coating may be heated. Heating can occur prior to spraying, during spraying, or after spraying to achieve different effects.

Heat to facilitate adhesion and mixing can also be provided by conduction from the target surface. The target surface may be heated for the intended purpose of heating the first or third metal on contact to improve adhesion, or the target surface may be heated as part of another process incidental to the coating process. One example of such incidental heating is the residual heat from annealing. Many ferrous substrates will be 400-800° F. (204-427° C.) immediately after annealing, although a ferrous substrate may be at virtually any temperature up to its melting point after annealing (for practical considerations this will generally be no more than about 1800° F. (about 980° C.)). In the case of iron, the substrate typically cools from 800° F. to 400° F. (427° C. to 204° C.); over such ranges the latent heat of the substrate will enhance the bonding of a zinc layer. The temperature of the target surface may be, for example, about the fusing temperature of the first, third or fourth metal. The temperature of the target surface may also be below the temperature of fusion of the first, third or fourth metal. For example, if the first metal were zinc, desirable substrate temperature ranges during spraying would be up to 850° F. (454° C.), 400-800° F. (204-427° C.), 400-500° F. (204-260° C.), or about these ranges. In one example, a metallic layer of zinc is arc sprayed as a wire on to a substrate of 6" ductile iron pipe while the substrate was at 250° F. (121° C.). In another example, a metallic layer of zinc was flame sprayed as a wire on to a substrate of 6" ductile iron pipe while the substrate was at 850° F. (454° C.). In both examples the inner coating consisted of 200 g of zinc per $m^2$ of substrate surface.

2. Application of Intermediate Composite Coating

If the intermediate coating is a composite coating, it can be applied using any method known in the art, but advantageously will be applied by co-spraying the third metal and a second component (such as the fourth metal or a metal oxide).

The third metal and second component may be sprayed simultaneously or sequentially. If sprayed sequentially, the earlier sprayed component will form a thin layer in which the later sprayed component is then embedded. It is desirable that both components will be in substantial contact with the inner coating. It is critical that the third metal be substantially electrically connected to the substrate, via the inner coating or other means. In this context, "substantially electrically connected" means that a substantial portion of the third metal deposited can convey a current to the substrate. If not electrically connected to the substrate, the third metal cannot serve as a sacrificial anode. Such electrical connection can generally only be achieved through direct contact between the third metal 6 and the inner coating, although it is possible that such a connection can be established across small gaps, particularly if such gaps contain an electrolyte.

If sprayed simultaneously, the third metal and second component may be sprayed from the same spray head or spray heads, in which case they must be mixed prior to emission from the spray head. The feed material may involve two separate feed streams, or it may comprise a single feed stream of mixed feed material (such as a wire or powder). Alternatively, the third metal and second component may be simultaneously sprayed from distinct spray heads; in this case, the components will not mix until they are aerosolized or until they impact the metallic layer. If sprayed from the same spray head, the third metal and second component will of necessity be at the same temperature when sprayed and the two components will of necessity be applied to the inner coating by the same spray method. The spraying technique may be any of those discussed above as useful in the process, including cold spraying, warm spraying and thermal spraying. If sprayed from distinct spray heads, either component may be sprayed by any technique discussed above as useful in the process independent of the other, including cold spraying, warm spraying and thermal spraying. The spray temperatures of each component will also be independently selected.

If thermal spraying is used, the sprayed component will be heated to a suitable temperature. The temperature may be the fusion temperature of the sprayed component, or it may be above the fusion temperature. If both components are sprayed at the same temperature (for example, when emitted from the same spray head), the temperature may be at or above the fusion temperature of the component having the higher fusion temperature. Thermal spraying techniques generally rely on the sprayed material being in a liquid state, whereas in cold spraying and warm spraying the sprayed material may be in a solid state or a liquid state. Either approach may be used in the process.

In order to achieve optimum benefits and performance of the intermediate composite coating, it is desirable that the thickness of the coating, the size of the droplets, and the concentration of the droplets be in a ratio designed such that the droplets in the coating are in contact with the sacrificial metal coating of the inner coating. Droplet size of the sprayed component may vary considerably depending on the type of material being sprayed, the type of application utilized, and many other variables. For example, the three most common methods of applying thermally sprayed metals to pipe are electric arc spray, combustion gas spray utilizing wire, and combustion gas spray utilizing powder. Among the variables that affect the chosen droplet size of the third and second component are the form of the feed (wire, powder, liquid, etc.), size of the feed particles, feed rate, air delivery pressure, combustion gas pressures (for combustion gas spray), voltage utilized (for electric arc spray), type of spray gun utilized, spray tip configuration, spray tip size, distance from the spray gun tip to the part being sprayed, and ambient conditions.

It is necessary that the thickness of the intermediate composite coating be properly designed based on metal particle size and configuration and the concentration of the metal particles dispersed in the intermediate composite coating. One object is to ensure that the third metal will be substantially electrically connected to the substrate. This can be achieved, for example, by ensuring that the thickness of the layer does not exceed the average diameter of the individual metal particles. As another example, the same goal can be achieved by ensuring that the desirable matrix configuration is such that the size and concentration of the metal droplets are sufficient to result in an electrically continuous conductive path from one side of the intermediate composite coating to the other.

Prior to the application of the metal coating, the target surface may be abrasive blast cleaned. Abrasive blast cleaning can be used to remove contaminants while allowing protective oxides to remain on the target surface. Abrasive blast cleaning also can serve to increase adhesion between the target surface and the metal coating by abrading the target surface. Blast cleaning is more suitable for the metallic substrate than for example the first coating, as the metallic substrate will in most cases be thicker and more durable than the first coating.

3. Application of Outer Coating

Some embodiments of the process comprise applying the outer coating to at least one of the inner coating or intermediate coating. The outer layer may be applied by any means known in the art, but it is particularly advantageous to apply the outer layer by the advanced spray methods disclosed herein.

Applying the outer layer provides a barrier layer without need for further assembly or application when a metal structure is installed. This has significant advantages over previous methods, which often require that coverings or sheaths be placed over surfaces or pipes prior to installation. Such methods are vulnerable to errors in deployment and accidents that can result in incorrect use of the barrier or damage to the outer coating. Some advantages of applying the outer coating via advanced spray methods are that it can be performed during manufacturing, it can be performed quickly, it can be performed at low cost, and it can provide thin and consistent layering.

Thermal spraying is a suitable method for applying the outer coating. Because of the high temperatures of fusion of many metal oxides, plasma spraying is a particularly suitable method. The spraying of the outer coating will be subject to the same parameters and requirements as discussed above for the spraying of the inner coating and the intermediate coating.

B. Examples

An embodiment of the coating was applied to a ductile iron pipe for field testing. The pipe was heated to about 500° F. prior to application of the inner coating. An inner coating of over 99% metallic zinc was applied to the ductile iron pipe by thermal spraying (arc spraying) using a Miller Thermal PF40 arc spray unit. An intermediate coating comprising over 99% metallic aluminum was applied to the inner coating by the same method. An outer coating of $Al_2O_3$ was applied to the intermediate coating by thermal spraying (flame spraying) using a Sulzer-Metco 5P-II thermospray flame spray unit. An asphalt topcoat was then applied to the outer coating.

The coated metal pipe was buried in an aggressive subtropical wetland soil for one year. An uncoated ductile iron pipe was buried at the same site for the same period as a negative control. After one year, both pipes were excavated an examined. The sample with the protective coating showed no corrosion, whereas the uncoated ductile iron pipe was highly corroded.

The same coated metal pipe has been tested in the laboratory by immersion in 5% NaCl solution over long periods. Coated pipe immersed in 5% NaCl for nine months at room temperature significantly outperformed ductile iron having only an asphalt coating, as did coated pipe exposed to a constant 1 hour wet/dry cycle in 5% NaCl for seven months at room temperature.

C. Conclusions

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein.

We claim:

1. A coated metal surface comprising:
(a) a metallic substrate;
(b) an outer coating comprising a thermally sprayed oxide of a second metal, wherein the oxide of the second metal is dielectric, and whereto said outer coating is dielectric;
(c) a thermally sprayed inner coating disposed between the substrate and the outer coating, the inner coating comprising at least 99% wt metallic zinc, wherein the inner coating is substantially electrically connected to the metallic substrate; and
(d) further comprising an intermediate coating disposed between the inner and the outer coating, the intermediate coating comprising a third metal and the oxide of the second metal;
wherein the intermediate coating is a thermally co-sprayed composite; and
wherein the intermediate coating comprises metallic aluminum and aluminum oxide, and the outer coating comprises aluminum oxide.

2. A coated metal surface comprising:
(a) a metallic substrate;
(b) an outer coating comprising a thermally sprayed oxide of a second metal, wherein the oxide of the second metal is dielectric, and wherein said outer coating is dielectric;
(c) a thermally sprayed inner coating disposed between the substrate and the outer coating, the inner coating comprising at least 99% wt metallic zinc, wherein the inner coating is substantially electrically connected to the metallic substrate; and (d) further comprising an intermediate coating disposed between the inner and outer coating, the intermediate coating comprising a third metal that is anodic to the metallic substrate, and wherein the third metal is substantially electrically connected to at least one of: the metallic substrate and inner coating, wherein:

(e) the inner coating has a thickness of about 2-3 mils;
(f) the intermediate coating has a thickness of about 2-3 mils;
(g) the outer coating has a thickness of about 2-6 mils; and
(h) the combined thickness of the inner coating, intermediate coating, and outer coating is no more than about 10 mils.

3. The coated metal surface of claim 2, wherein the oxide of the second metal is selected from the group consisting of: an oxide of aluminum, an oxide of magnesium, an oxide of silicon, and an oxide of titanium.

4. The coated metal surface of claim 3, wherein the oxide of the second metal is $Al_2O_3$.

5. The coated metal surface of claim 2, wherein the third metal is anodic to metallic zinc.

6. The coated metal surface of claim 2, wherein the third metal is an alloy comprising zinc and aluminum.

7. A coated metal surface comprising:
(a) a metallic substrate;
(b) an outer coating comprising a thermally sprayed oxide of a second metal, wherein the oxide of the second metal is dielectric, and wherein said outer coating is dielectric;
(c) a thermally sprayed inner coating disposed between the substrate and the outer coating, the inner coating comprising at least 99% wt metallic zinc, wherein the inner coating is substantially electrically connected to the metallic substrate; and
(d) further comprising an intermediate coating disposed between the inner and outer coating, the intermediate coating comprising a third metal that is anodic to the metallic substrate, and wherein the third metal is substantially electrically connected to at least one of: the metallic substrate and the inner coating;
wherein the third metal comprises at least 50% wt of zinc or aluminum.

8. The coated metal surface of claim 7, wherein the third metal consists essentially of aluminum.

9. The coated metal surface of claim 7, wherein the inner coating is in direct contact with the substrate, the intermediate coating is in direct contact with the inner coating, and the outer coating is in direct contact with the intermediate coating.

10. The coated metal surface of claim 7, wherein the third metal is an alloy comprising a metal selected from the group consisting of: metallic zinc, the second metal, and a combination of the foregoing.

11. The coated metal surface of claim 7, further comprising an organic topcoat.

12. The coated metal surface of claim 11, wherein the organic topcoat is selected from the group consisting of: asphalt, wax, and paint.

13. The coated metal surface of claim 7, wherein the intermediate coating is a composite of the third metal and a fourth metal.

14. A fluid conveyance comprising the coated metal surface of claim 7.

15. The fluid conveyance of claim 14, wherein the conveyance is of a type selected from the group consisting of: a pipe, a pipe fitting, a pipe valve, a pump component, a pipe fixture, and an appurtenance to a pipe.

16. A coated metal surface comprising:
(a) a metallic substrate comprising a ferrous metal;
(b) a thermally sprayed inner coating consisting essentially of metallic zinc, wherein the inner coating is about 2-3 mils thick, and wherein the inner coating is substantially electrically connected to the metallic substrate;
(c) a thermally sprayed intermediate coating consisting essentially of aluminum or an aluminum alloy, wherein the intermediate coating is about 2-3 mils thick, and wherein the intermediate coating is electrically connected to the inner coating;
(d) a thermally sprayed outer coating on the opposite side of the intermediate coating from the inner coating, said outer coating consisting essentially of thermally sprayed $Al_2O_3$ and wherein the outer coating is about 2-6 mils thick; and
(e) an organic topcoat on the opposite side of the outer coating from the inner coating;
wherein the combined thickness of the inner coating, the intermediate coating, and the outer coating is no more than about 10 mils thick.

* * * * *